June 24, 1941.   D. M. BALDWIN   2,247,145
VESSEL FOR THE TRANSPORT OF VEHICLES
Original Filed Jan. 24, 1939   3 Sheets-Sheet 1

INVENTOR
Delavan M. Baldwin
BY
ATTORNEYS

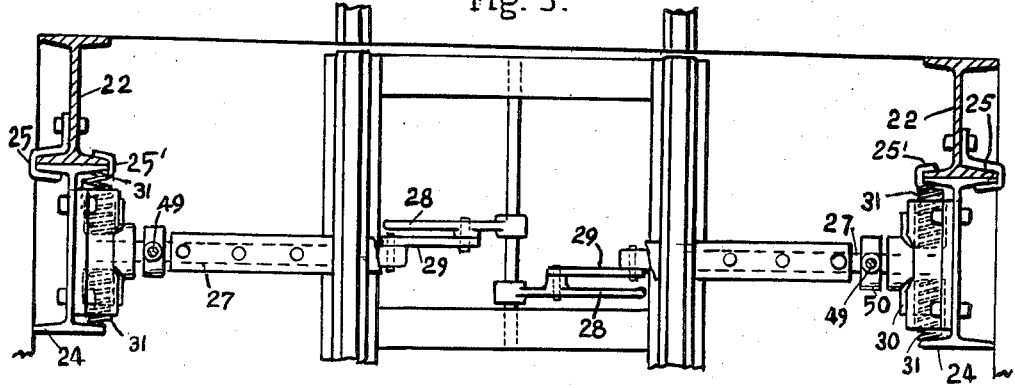
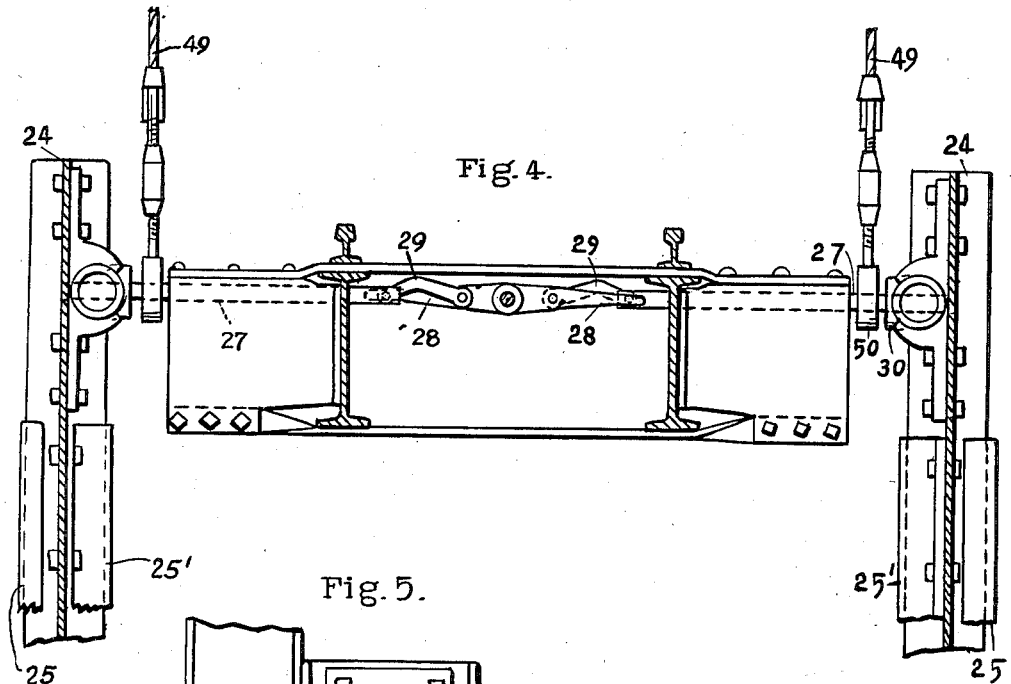
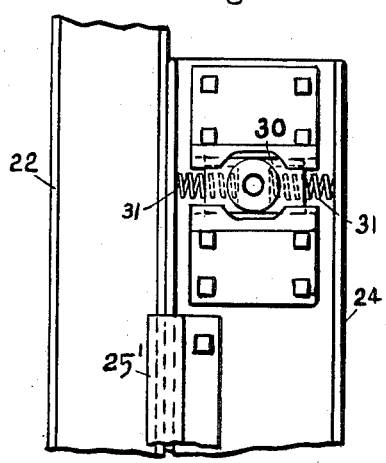

Patented June 24, 1941

2,247,145

UNITED STATES PATENT OFFICE 2,247,145

VESSEL FOR THE TRANSPORT OF VEHICLES

Delavan Munson Baldwin, New Canaan, Conn.

Continuation of application Serial No. 274,703, May 20, 1939, which is a division of application Serial No. 252,616, January 24, 1939. This application October 14, 1940, Serial No. 361,135

9 Claims. (Cl. 114—72)

This invention relates to the transportation of vehicles in vessels equipped with elevators and adapted for the loading of vehicles from ports or railway terminals or yards, the storage of said vehicles and the unloading thereof at the point of destination. The word "vehicle" is employed herein in its broadest sense as an instrument of conveyance however supported for movement, as for example, on wheels, runners, casters, or independent rollers. Examples of vehicles for which the invention is particularly adapted are railway cars, trucks, tractors, trailers, airplanes, Army and Navy mechanized equipment, low flat cars primarily for use in the transportation of "containers" between docks, railway terminals or yards and the vessels hereof.

A complete description of the entire means and mechanism for the above purpose is to be found in my companion co-pending application Ser. No. 252,616 filed January 24, 1939. In said application the claims are generally directed to combination of elements carried on the vessel with elements carried on shore or to hoisting mechanism either on the shore or on the vessel for raising and lowering the vessel elevators or to safety control means for the elevators.

The claims of this application on the other hand are directed to the vessel structure and its adaptation to the elevators employed and to the elevator structure in combination therewith.

It is to be specifically understood that no abandonment of any of the claims not presented in said application Ser. No. 252,616, filed January 24, 1939 or in this application is to be incurred by the order in which the Letters Patent thereon may issue, or by the fact that all of the claims are not presented in a single patent.

The object of this invention is to provide a vessel for the transport of vehicles on a plurality of decks with elevators vertically guided in shaftways by which the vehicle loaded or empty can be carried from one deck to another or elevated above the top deck to make connection with a landing bridge.

A further object is to provide supplementary elevator platforms in each shaftway which can be detached from the hoisting cables and supported independently thereof with vehicles thereon and the vessel more fully loaded.

A further object is to provide convenient means for detachably connecting the hoisting cables to the elevator platforms and shifting the connections to the platform on which a vehicle is to be elevated or lowered together with means for independently supporting the other platforms and relieving the hoisting mechanism of their additional weight.

A further object is to provide connections between the platforms and guides in each shaftway which are flexible and yieldable so that there will be no binding in case that the guides are not perfectly parallel or that the platform is tilted by reason of the cables not being of exactly the same length.

A further object is to provide convenient means for retracting the means for independently supporting the platforms opposite the decks so that they can be passed therethrough.

In the accompanying three sheets of drawings which form a part hereof, I have shown the invention in connection with railway freight cars and I have provided rails on the elevator platforms and decks of the vessel for the convenient movement, guidance and location of the railway cars on the platforms and decks of the vessel. It should be understood, however, that such showing is purely for the purpose of illustration and is not limitative upon the scope or character of this invention.

Fig. 3 is an enlarged horizontal section through one end of an elevator shaftway including one end of a platform together with its connection to slides and hoisting cables.

Fig. 4 is a vertical transverse section through the platform and connections.

Fig. 5 is an elevation of a portion of a guide and slide.

Figure 1:
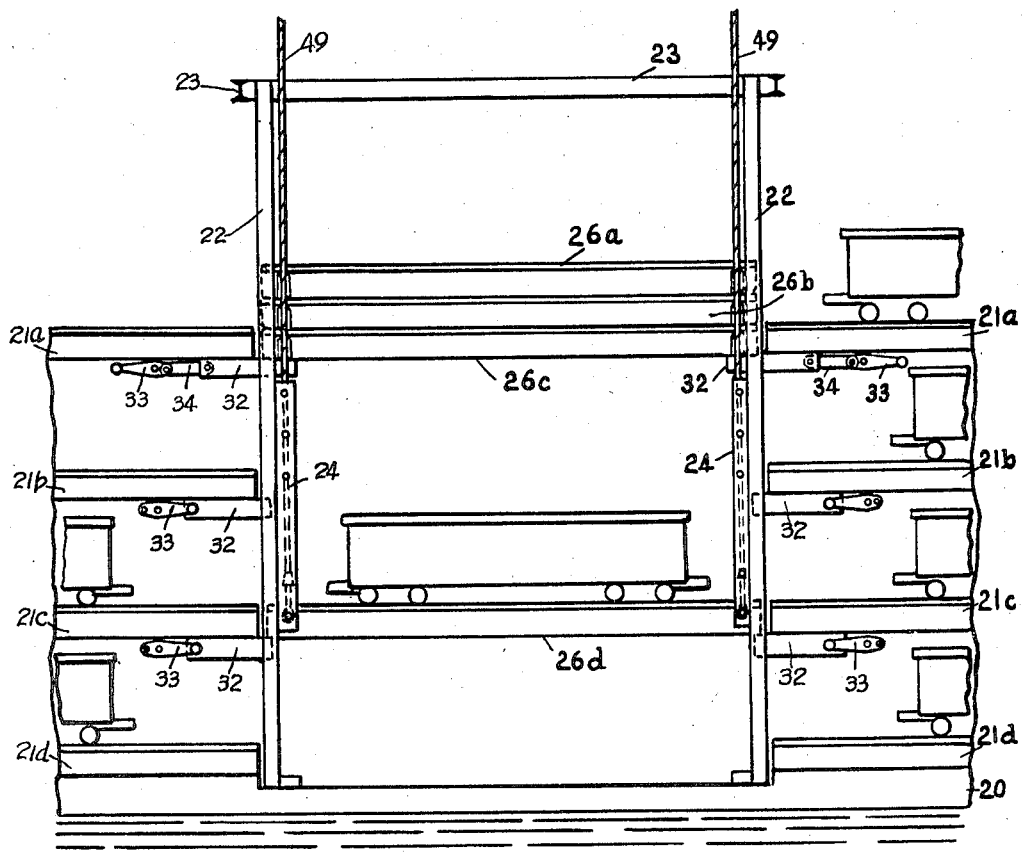
Figure 1 is a vertical longitudinal section through a portion of a vessel including one of the elevators embodying this invention.

A vessel 20 with a top deck 21a, a main deck 21b, a between deck 21c, and a bottom deck 21d, on which freight cars are shown, has elevator guides 22 in the form of I-beams at the four corners of each of four shaftways connecting the decks of the vessel. The guides extend above the top deck and are braced at their upper ends by a frame 23.

Elevator cars travel in each of the shaftways. Each car includes four slides 24 in the form of I-beams. Channels 25, 25' lock the slides to the guides. Four detachable platforms 26a, 26b, 26c, and 26d are connected to the slides in each shaftway, one at the lower ends and the others at the upper ends of the slides, spaced from the lower platform sufficiently to afford head room for the vehicle that is to be carried.

The connection is by round platform bolts 27, each operated by a lever 28 through a toggle line 29. The bolts lock into gimbal blocks 30. These afford flexibility between the platforms and the slides with respect to two horizontal axes so that a slight tilting of the platforms will not cause the connections with the slides to bind. A short endwise movement of the gimbal blocks allows for inaccuracies in the alignment of the guides. Springs 31 center the blocks as much as possible from such yielding and insure that the platforms will clear the openings through the decks in passing therethrough.

Deck bolts 32 under each of the three uppermost decks are projected into the shaftway for the elevator platforms to rest on and match the deck at which a car is to be transferred. The bolts are operated by levers 33 through toggle links 34. Retractable bolts are not required for the bottom deck since the platforms do not pass through. Instead the tank top which serves as the bottom deck is depressed in the shaftways leaving openings in which the platforms can rest in matching relation with the bottom deck.

The elevators are preferably located about midship so that about the same number of cars can be carried fore and aft and reduce to a minimum the number of cars of an incoming load that need to be removed before replacements can be made with cars for the outgoing load.

Hoisting cables 49 lift and lower the elevators. As under ordinary conditions of transportation the elevators are preferably to be operated only when the vessel is berthed, the cables may be led to land-supported hoisting drums or the hoisting apparatus may be carried entirely by the vessel. The cables terminate in eyes 50 through which the platform bolts pass. When the bolts are retracted at any platform, openings between the platform and the slides are thereby left through which the cables may be passed and connected to a platform below.

The preferred operation of the elevators will depend on the docking provisions for unloading and loading which may be either directly from the elevator platforms to a bridge over the vessel or to a bridge connecting with one of the decks, usually the main deck under the top deck. In either case, assuming that the vessel arrives in port with an incoming load to be discharged and replaced with an outgoing load, the loads including four cars carried in each of the elevator shaftways, it will be desirable to unload simultaneously either at the two outer elevators or at the two middle elevators, and likewise as to the loading to avoid undue listing of the vessel.

Two examples are now set forth of loading and unloading the vessel. It is to be understood, however, that these examples are illustrative and not limitative, for many variations will be apparent to those skilled in the art.

Figure 2:
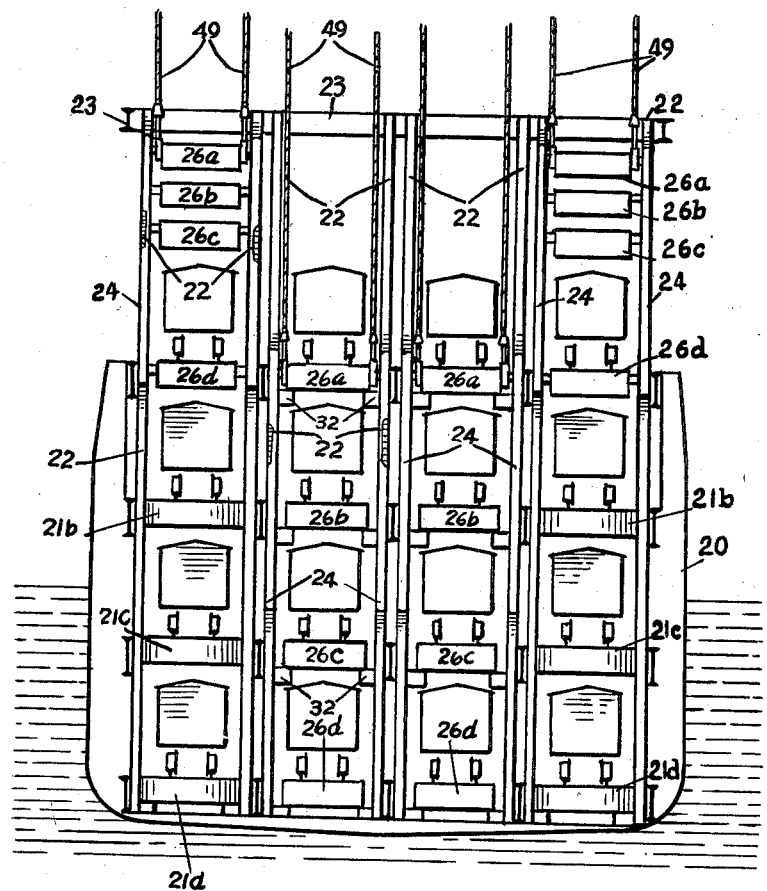
Fig. 2 is a vertical transverse section through the vessel at the elevators.

If the elevator platforms are to connect directly with a landing bridge above the top deck, the procedure at each elevator will be as follows: The cables are lowered and attached to the uppermost platform which is bolted at the uppermost bolt-holes of the slides as shown in the two middle elevators of Fig. 2. The cable lengths are adjusted so that the platform when lifted will be leveled and brought even with the landing bridge. The platform is hoisted to the landing bridge and the car thereon is rolled off. The platform is next lowered to permit the platform to rest on the deck bolts of the top deck from which a car can now be rolled onto the platform hoisted and discharged to the landing bridge. After the cars either fore or aft have thus been unloaded the space vacated is filled with cars for the outgoing load. When the cars on the top deck have thus been exchanged, with the exception of the car to be carried in the shaftway, the second platform is bolted to the lowermost bolt-holes of the slides and is used to exchange the incoming and outgoing cars on the second or main deck. This platform is then transferred from the lower ends of the slides to the second of the bolt-holes at the upper ends and the third platform is bolted to the lowermost bolt-holes and similarly used to exchange the incoming and outgoing cars on the third deck after which it is transferred to the third of the bolt-holes at the upper ends of the slides. The fourth platform can now be bolted to the lowermost bolt-holes of the slides, the cars exchanged on the bottom deck and a car left on the platform which is unbolted from the slides and left at the bottom deck. Finally the other platforms are restored in reverse order with outgoing cars thereon which are to be carried in the shaftway.

If the docking provisions are for connection to the landing bridge from the main deck, the procedure at each elevator will be as follows: The cars will first be taken off from the main deck and from the elevator platform thereat. This platform will have the cables connected thereto and it will be hoisted up under the elevator platform at the top deck which carries a car. The deck bolts under it at the top deck and at the main deck are retracted and the two platforms are lowered and hoisted together between the top deck and the main deck until the incoming cars have been taken off and replaced by outgoing cars on the top deck. The cars on the between deck and on the bottom deck are next exchanged as in the first above described procedure except that the elevator discharges and takes on cars at the main deck and only the bottom elevator platform is used after discharging the car stored on the platform at the between deck. The three upper platforms are supported at the top deck as shown in Fig. 1 and the elevator mechanism is required to lift only one platform with a car. Finally the platforms are restored in reverse order and the shaftway is filled with cars for the outgoing load.

This application is a continuation of my application Ser. No. 274,703, filed May 20, 1939, as a division of said application Ser. No. 252,616, filed January 24, 1939.

The foregoing detailed description has been given for clearness of understanding and no undue limitation should be inferred therefrom.

I claim:

1. A vessel having a plurality of decks and an elevator shaftway with guides therein, hoisting cables, an elevator car comprising slides engaging the guides and a plurality of elevator platforms detachably connected to the slides, means for detachably connecting the cables to the platforms, and means for supporting the platforms opposite each deck independently of the hoisting cables.

2. A vessel having a plurality of decks and an elevator shaftway with guides therein, hoisting cables, an elevator car comprising slides engaging the guides and a plurality of elevator platforms detachably connected to the slides, retractable bolts for detachably connecting the cables to the platforms, and means for supporting the platforms opposite each deck independently of the hoisting cables.

3. A vessel having a plurality of decks and an elevator shaftway with guides therein, hoisting cables, an elevator car comprising slides engaging the guides and a plurality of elevator platforms detachably connected to the slides one of which is connected at the lower ends of the slides and the others of which are connected adjacent to the upper ends of the slides, means for detachably connecting the cables to the platforms, and means for supporting the platforms opposite each deck independently of the hoisting cables.

4. A vessel having a plurality of decks and an elevator shaftway with guides therein, hoisting cables, an elevator car comprising slides engaging the guides and a plurality of elevator platforms detachably connected to the slides one of which is connected at the lower ends of the slides and the others of which are connected adjacent to the upper ends of the slides, retractable bolts carried by the platforms for detachably connecting the cables to the platforms, and means for supporting the platforms independently of the hoisting cables opposite to the decks through which the platforms are required to pass.

5. A vessel having a plurality of decks and an elevator shaftway with guides therein, hoisting cables, an elevator car comprising slides engaging the guides and a plurality of elevator platforms detachably connected to the slides one of which is connected at the lower ends of the slides and the others of which are connected adjacent to the upper ends of the slides, retractable bolts carried by the platforms for detachably connecting the cables to the platforms, and retractable means for supporting the platforms independently of the hoisting cables opposite to the decks through which the platforms are required to pass.

6. In a vessel comprising a plurality of decks and a shaftway connecting the decks, the combination of guides in the shaftway; means for hoisting, lowering, and supporting vehicles in the shaftway comprising a plurality of platforms movable vertically in the shaftway and directed by the guides; hoisting mechanism; mechanism for detachably connecting the hoisting mechanism to the individual platforms; and means for supporting the platforms in the shaftway independently of the hoisting mechanism.

7. In a vessel comprising a plurality of decks and a shaftway connecting the decks, the combination of guides in the shaftway, slides engaging the guides and movable vertically in respect thereto, a plurality of elevator platforms, hoisting cables, bolts carried by each platform engaging the slides and cables for hoisting and lowering the platforms and retractable from the slides and cables for platform storage, and means carried by the decks for supporting the platforms when disengaged from the hoisting cables and slides.

8. In a vessel comprising a plurality of decks and a shaftway connecting the decks, the combination of guides in the shaftway; a plurality of elevator platforms; slides engaging the guides, movable in respect thereto and embodying flexible and horizontally yieldable means for supporting the platforms; means for detachably connecting the platforms with the said flexible and horizontally yieldable means; hoisting cables detachably connected with the slides for hoisting and lowering the platforms when connected with the slides; and means carried by the decks for supporting the platforms when disengaged from the slides.

9. In a vessel comprising a plurality of decks and a shaftway connecting the decks, the combination of guides in the shaftway; a plurality of elevator platforms; slides engaging the guides, movable in respect thereto and embodying flexible and horizontally yieldable gimbals for supporting the platforms; retractable bolts carried by the platforms for detachably connecting the platforms with the said gimbals; hoisting cables detachably connected with the slides for hoisting and lowering the platforms when connected with the slides; and means carried by the decks for supporting the platforms when disengaged from the slides.

DELAVAN MUNSON BALDWIN.